No. 808,011. PATENTED DEC. 19, 1905.
J. CHERRY.
DEVICE FOR CONTROLLING HORSES.
APPLICATION FILED AUG. 11, 1904.

Witnesses.
Inventor
John Cherry

UNITED STATES PATENT OFFICE.

JOHN CHERRY, OF NOBLETON, CANADA.

DEVICE FOR CONTROLLING HORSES.

No. 808,011.
Specification of Letters Patent.
Patented Dec. 19, 1905.

Application filed August 11, 1904. Serial No. 220,421.

*To all whom it may concern:*

Be it known that I, JOHN CHERRY, of Nobleton, in the county of York, in the Province of Ontario, Canada, have invented certain new and useful Improvements in Devices for Controlling Horses, of which the following is the specification.

My invention relates to improvements in devices for controlling horses; and the object of the invention is to devise a simple attachment to the halter whereby horses may be prevented from jumping fences or biting or interfering with each other; and it consists, essentially, of a halter provided with rigid bars having attached to their lower ends a hinged extension connected by a joint which will allow of the bars to fold outwardly to permit of horses grazing or drinking, but will not fold inwardly, the parts being arranged and constructed in detail, as hereinafter more particularly explained.

Figure 1:
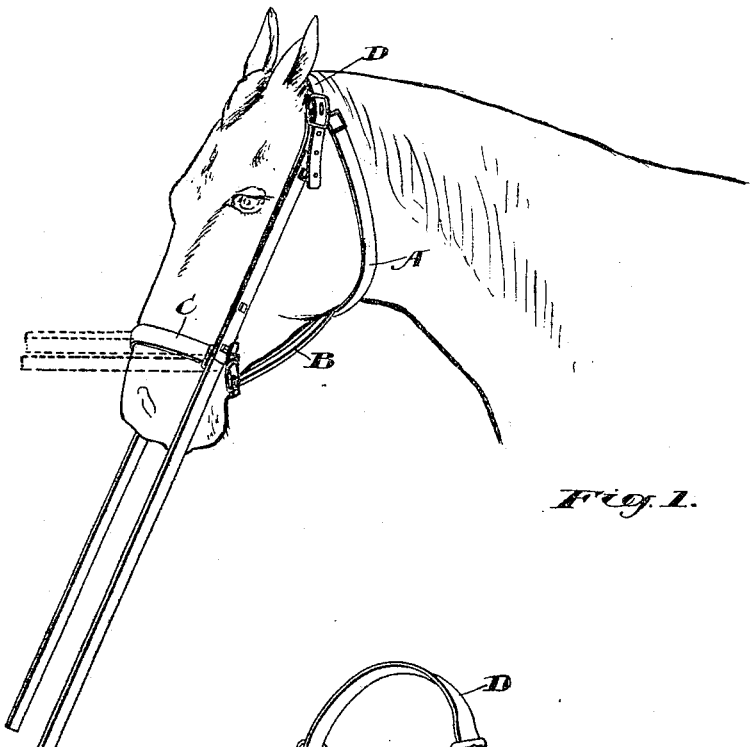
Figure 2:
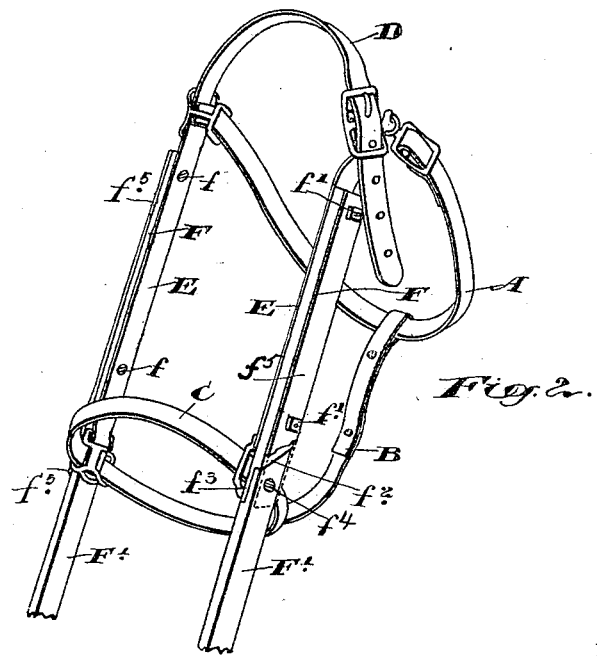

Figure 1 is a perspective view showing my improved device. Fig. 2 is an enlarged detail.

In the drawings like letters of reference indicate corresponding parts in each figure.

A is the neck-band of the halter, B the throat-band, C the nose-band, and D the head-band, which are connected together in the usual manner.

E E are the side bands, which are reinforced by stiff or rigid bars F F, secured to the same by bolts and nuts $f$ $f'$. The lower ends of the bars F F are provided with a bevel $f^2$ and a narrowed portion $f^3$ and have connected to them the extensions F' F', having the upper ends reversely formed, so as to fit the beveled ends $f^2$, the two parts being connected together by the pins $f^4$.

$f^5$ is a strip of thin metal to protect the bars F and to stiffen the same.

It will be noticed that the bevel is forwardly inclined from rear to front. It will consequently be seen that the bars may readily fold into the position shown in dotted lines in Fig. 1, so as to allow the horse to graze and drink; but such supplemental bars will not bend inwardly on account of the peculiar form of the joint, and thereby will serve to prevent the horse from jumping a fence or from interfering with each other.

What I claim as my invention is—

1. The combination with a halter having side straps, of the side bars attached to the side straps, and the extension-bars and means for connecting the extension-bars to the side bars, as and for the purpose specified.

2. The combination with the halter having side straps, of the side bars attached to the side straps and each provided with a narrowed lower end and a beveled portion at the junction of said narrowed portion with the bar and the extension-bars provided with a correspondingly-formed end and beveled portion and pins connecting the two bars as and for the purpose specified.

JOHN CHERRY.

Witnesses:
M. McLAREN,
A. A. BATES.